(12) United States Patent
Hamann

(10) Patent No.: US 7,507,059 B2
(45) Date of Patent: Mar. 24, 2009

(54) PROCESS AND MECHANICAL DEVICE FOR MACHINING FLEXIBLE PANELS, IN PARTICULAR WITH A COMPLEX SHAPE

(75) Inventor: Jean-Christophe Hamann, La Baule (FR)

(73) Assignee: Airbus France, Toulouse (FR)

( * ) Notice: Subject to any disclaimer, the term of this patent is extended or adjusted under 35 U.S.C. 154(b) by 346 days.

(21) Appl. No.: 11/053,176

(22) Filed: Feb. 8, 2005

(65) Prior Publication Data

US 2006/0039765 A1 Feb. 23, 2006

(30) Foreign Application Priority Data

Feb. 10, 2004 (FR) .................................. 04 01277

(51) Int. Cl.
*B23C 3/16* (2006.01)
(52) U.S. Cl. .................. 409/132; 29/34 B; 408/87; 408/1 R; 409/199; 409/238
(58) Field of Classification Search ................. 408/1 R, 408/19, 87–88, 10, 13, 95, 97, 234, 236; 409/175, 178, 199, 219, 131–132, 205, 238; 29/34 B; *B23C 3/13, 3/02, 3/16*
See application file for complete search history.

(56) References Cited

U.S. PATENT DOCUMENTS

| | | | | |
|---|---|---|---|---|
| 754,321 | A * | 3/1904 | Koeppen | 408/37 |
| 3,624,819 | A * | 11/1971 | Schickling | 408/92 |
| 4,679,969 | A * | 7/1987 | Riley | 408/87 |
| 4,762,261 | A | 8/1988 | Hawley et al. | |
| 4,885,836 | A * | 12/1989 | Bonomi et al. | 29/524.1 |
| 4,967,947 | A * | 11/1990 | Sarh | 227/52 |
| 4,995,148 | A * | 2/1991 | Bonomi et al. | 29/26 A |
| 5,040,278 | A * | 8/1991 | Eckold et al. | 29/243.53 |
| 5,201,615 | A * | 4/1993 | Patterson et al. | 408/87 |
| 5,314,271 | A * | 5/1994 | Christiano | 408/87 |
| 5,404,641 | A * | 4/1995 | Bratten et al. | 29/897.2 |
| 5,409,328 | A * | 4/1995 | Noda | 408/100 |
| 5,542,796 | A * | 8/1996 | Bratten et al. | 408/13 |
| 5,924,827 | A * | 7/1999 | Mora et al. | 408/87 |
| 6,014,802 | A * | 1/2000 | Guerin | 29/407.01 |
| 6,098,260 | A * | 8/2000 | Sarh | 29/243.53 |
| 6,334,745 | B1 * | 1/2002 | Bennett, Sr. | 409/132 |
| 6,905,291 | B2 * | 6/2005 | Day et al. | 408/67 |
| 6,979,288 | B2 * | 12/2005 | Hazlehurst et al. | 483/1 |
| 7,076,856 | B2 * | 7/2006 | Sarh | 29/524.1 |
| 7,168,898 | B2 * | 1/2007 | Hamann | 409/199 |
| 2007/0274797 | A1 | 11/2007 | Panczuk et al. | |

FOREIGN PATENT DOCUMENTS

| | | |
|---|---|---|
| DE | 41 25 946 A1 | 2/1992 |
| EP | 0 338 117 A2 | 10/1989 |
| EP | 1 245 317 A1 | 10/2002 |
| WO | WO 2005/046931 A1 | 5/2005 |

* cited by examiner

*Primary Examiner*—Daniel W Howell
(74) *Attorney, Agent, or Firm*—Patterson, Thuente, Skaar & Christensen, P.A.

(57) ABSTRACT

A mechanical method for machining flexible panels, in particular panels with a complex shape, in which the panel to be machined is held fixed on its periphery on a rigid support, and a machining tool is applied against one of the faces of the panel and is controlled to perform the desired machining. The method includes at least counterbalancing the machining force exerted by the tool on the panel by applying a force approximately opposing the tool through an appropriate means of support on a face of the panel opposite the face where the tool is applied, with the means of support being independent of the tool.

20 Claims, 4 Drawing Sheets

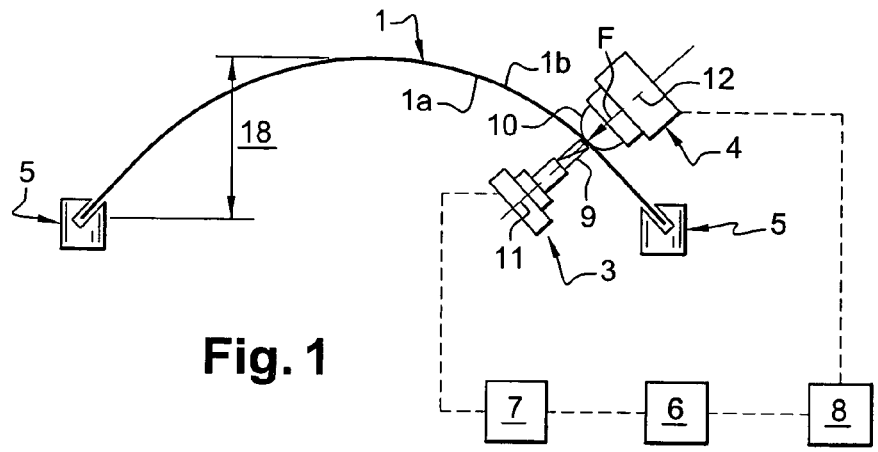
Fig. 1
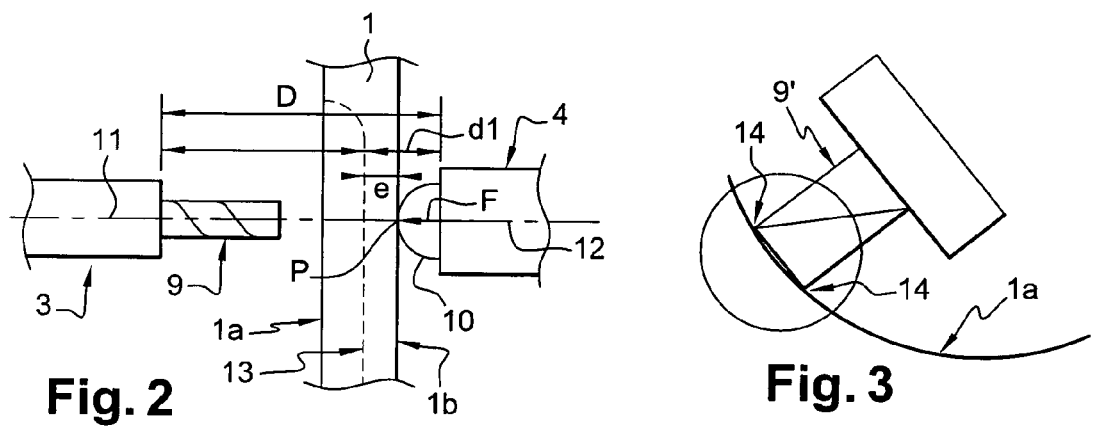
Fig. 2
Fig. 3
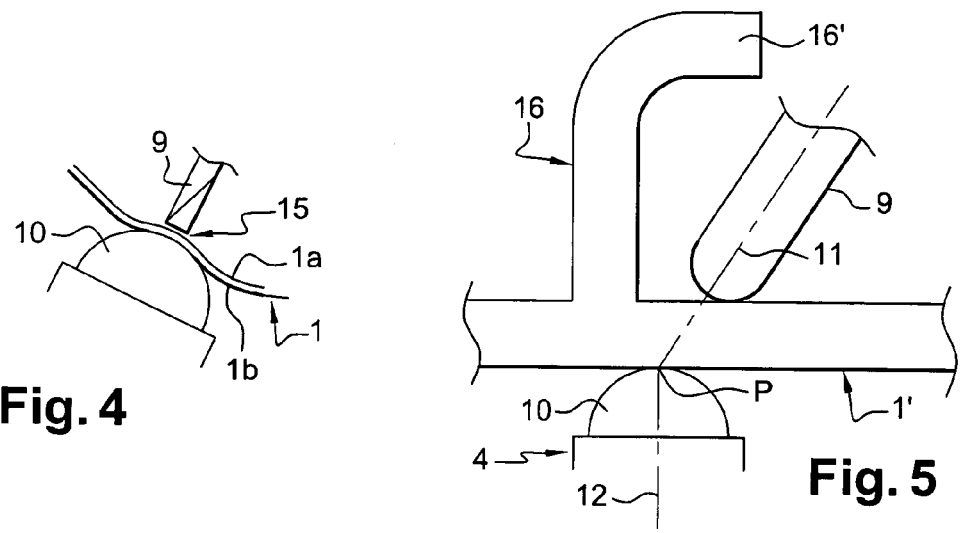
Fig. 4
Fig. 5

PROCESS AND MECHANICAL DEVICE FOR MACHINING FLEXIBLE PANELS, IN PARTICULAR WITH A COMPLEX SHAPE

RELATED APPLICATION

The present application claims priority to French Application No. 04 01277 filed Feb. 10, 2004.

TECHNICAL FIELD

The present invention relates to machining by stock removal from thin and flexible parts, in particular parts having a complex shape and nondevelopable shape such as, for example, the skin panels of aircraft fuselages.

BACKGROUND OF THE INVENTION

An object of the invention is a machining method which is particularly applicable to panels of the metal type, with or without stiffeners, or composites, or of the "sandwich" type, on which machining operations involving their thickness are to be performed, such as surfacing or the formation of recesses or cells, or trimming or drilling operations.

More particularly, the panels are skin panels having a double curvature, mainly located on an aircraft's nose cone. These panels, generally made of a light alloy, range from 1 to 12 mm thick depending on the aircraft and the constituent materials of the panel (aluminum alloy, titanium alloy, and metallic or organic resin based composite).

If the material allows, the production of these panels requires shaping by drawing on a necessarily convex mold, while panels of composite material are shaped by draping-gluing-infusion and compaction methods.

Because of its productivity and its flexibility, shaping by drawing is mainly employed.

This type of shaping is performed by means of a combination of traction on the panel and "envelopment" of the convex mold so that the geometrically known shape of the panel (that which was in contact with the drawing mold) is the internal (concave) surface. The drawing process generates a plastic deformation on the entirety of the panel's thickness and consequently leads to a thinning of the section through necking. Due to the nondevelopable nature of the shape, this "loss of thickness" is not uniform over the panel's entire surface.

The known methods for mechanical machining for thickness machining operations on such panels having a double curvature such as those mentioned above consist of placing and holding them in position either on rigid tools or on beds of suction cups. In both cases, this hyperstatic positioning does not make it possible to support the panels at all points. This imperfect positioning has two consequences on the quality and the performance of mechanical machining:

It is impossible to support high cutting stresses, which reduces productivity.

No physical reference to the points which are not in contact with the positioning element is available and it is consequently impossible to obtain precise dimensions, in particular the thickness, without having recourse to complex measurement systems.

Other problems are encountered in machining, in addition to the problem of referencing the panel.

It is, in particular, possible to produce recesses while milling complex concave surfaces by sweeping the surface, mainly with cutters having spherical ends or toroidal cutters. The quality constraints define a maximum roughness as well as a maximum allowable jog between sweeping passes. In the case of parts affected by fatigue, as is the case with aeronautical pans, these criteria are strict and the order of magnitude of these requirements is 1.6 μm in $R_a$ for roughness and 0.04 mm for the jog tolerance.

Obtaining such criteria with a cutter having a spherical end implies the use of closer spaced sweeping cuts and therefore a reduced productivity. In addition, since the center part of the cutters having pherical ends are moved at a cutting speed of zero, the removal of material occurs there under very poor conditions, which degrades the resulting surface quality.

To resolve this disadvantage, it suffices to introduce a de-chucking, typically between 5 and 20°, so that the center of the tool is no longer in contact with the machined surface. However, this practice poses problems with local management of tool accessibility and collisions, perpendicular to the surface, problems which burden the preparation phase of the parts.

Toroidal cutters make it possible to use bigger sweeping cuts with equivalent jogs, i.e. a sweeping cut equal to the diameter of the cutter minus the diameter of the torus makes it possible, in theory, to obtain a zero jog, which provides a double advantage:

higher productivity (directly proportional to the sweeping cut size), and the center of the tool is not involved, resulting in a better surface quality and an increased lifespan of the tool.

On the other hand, the use of a toroidal tool poses a problem in following the trajectory and of geometrical "over-cutting" which is also called "gouging" or "heeling." This over-cutting varies depending on the radius of the trajectory, and its variability thus ends up being added to the dispersions of various origins relating to the thickness tolerance at the bottom of a hole. To solve this problem, it is also possible to de-chuck the tool, but the trajectory corrections are complex in the case of a toroidal tool.

SUMMARY OF THE INVENTION

It is the object of the present invention to solve the various aforementioned problems.

A method for mechanical machining of a flexible panel having a complex shape, the method comprising the steps of: holding the panel to be machined fixed on a periphery on a rigid support; applying a machining tool against a first surface of the panel and controlling the tool to perform a machining operation; and counterbalancing a machining force exerted by the tool on the panel by applying a force approximately opposing the tool through the application of a means for support to a second surface of the panel opposite the first surface to which the tool is applied, wherein the means for support is independent of the tool.

The method of the invention allows for significant improvements in comparison with existing processes, notably while producing recesses requiring a precision for the bottom depth of, for example, less than 0.2 mm for parts whose surface area is about 10 m² having a thickness of 2.5 mm.

Indeed, the permanent application of the means for support opposing the tool, which is applied to the other side of the panel, makes it possible to precisely and constantly control the thickness of the material remaining under the tool, independent of possible local fluctuations in thickness inherent to the process of producing the panels, as is, in particular, the case with metal panels that are produced by drawing, and also independent of possible deviations in shape with respect to the theoretical shape, which is a consequence of the precision of the process of producing the aforesaid rough panels.

Although the application of the counterbalancing force is independent of the machining tool's displacement kinematics, it is easy to synchronize the respective displacements of the tool and of the means for support which applies the counterbalancing force, so as to produce the aforesaid recesses with a bottom depth that is precise and constant over the entire extent of the recess and to also carry out the machining of concave shapes according to complex trajectories.

Indeed, in the case of the machining of a concave surface with toroidal cutters, it is possible to locally increase the supporting force across from the tool in a controlled manner thus avoiding over-cutting due to the concave curvature of the wall being machined, without having to de-chuck the tool, which appreciably simplifies control of the latter.

The method of the invention furthermore allows for the removal of material at a high stock removal rate, thanks to significant cutting depths without the risk of deformation of the panel under the cutting pressure.

A further object of the invention is a device for implementing the above method, the device comprising: a rigid tool adapted to frame a panel to be machined and to hold the panel on at least part of a periphery of the panel; a machining head adapted for multi-axial mobility and numerical control; a mobile means for support adapted to be positioned on a first surface of the panel opposite a second surface facing the machining head; means for controlling displacement of the mobile means for support in permanent contact with the panel; command and control means for synchronous displacement of the machining head and the mobile means for support; and command and control means for mutual separation between the machining head and the mobile means for support.

Such a device can be designed according to various machine tool architectures, such as:
- the number of axes controlled for the active part and the mobile support;
- the position of the panel being machined;
- the elements to which the movements corresponding to the relative displacements of the mobile support and the tool are applied; and/or
- the use or not of an overall and/or a local measuring device.

It is thus, in terms of a nonrestrictive example, possible to implement an architecture known as a 2×5-axis design which very schematically consists of two structures of the 5-axis type which respectively control the mobile means of support and the machining head, or an architecture known as a 2×4-axis design, wherein the mobile means for support is not oriented with respect to the local normal, with the machining head being controlled so that its axis passes through the point of contact of the means for support with the panel.

BRIEF DESCRIPTION OF THE DRAWINGS

The method of this invention as well as the various modes of implementation mentioned above with their respective advantages and areas of application will now be described in greater detail by referring to the attached drawings, in which:

FIG. 1 is a diagrammatic view illustrating the principles of the machining process according to the invention.

FIG. 2 is a partial cross sectional view of a panel illustrating the production of a recess in accordance with the process of this invention.

FIG. 3 illustrates the phenomenon of over-cutting during the machining of a concave surface using a toroidal cutter.

FIG. 4 illustrates the elimination of the phenomenon of over-cutting from FIG. 3 by implementing the process from this invention.

FIG. 5 illustrates the machining of a panel with a skewed cutter in accordance with the process of the invention.

DETAILED DESCRIPTION OF THE DRAWINGS

Figure 6:
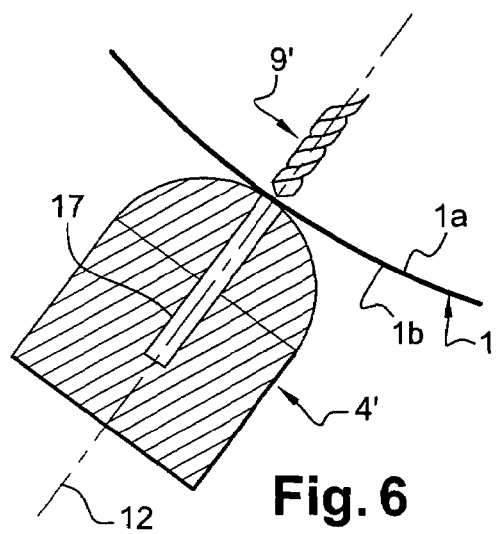
FIG. 6 illustrates the production of a drilled hole in the axis of a mobile support which is disengaged at the center.

FIG. 1 shows a thin, flexible panel 1 having a non-developable shape, for example a metal skin panel for an aircraft fuselage which has been shaped beforehand by drawing to produce a convex shape in a known manner.

As described above, such a panel 1 shows thickness variations over its entire surface. The geometrically known surface of the panel 1 is the internal concave first surface 1a, which was in contact with the drawing mold. The reference surface is the opposite convex second surface 1b, which corresponds to the external wall of the fuselage which will be produced by means of the panel.

With the panel 1 being machined on its geometrically known surface 1a, while the reference surface is the surface 1b and the thickness of the panel is likely to have variations which are not known, there is obviously a machining problem, in particular if one wishes to produce recesses whose bottom depths have to obey a very tight machining precision in comparison with the size of the panel, for example a precision of less than 0.2 mm for a panel extending over a developed surface of approximately 10 m$^2$.

This problem is solved by proceeding as illustrated in FIG. 1, namely by constantly positioning a mobile means for support 4 facing the surface 1b opposite the machining tool 3 facing the surface 1a, with the panel 1 being held on its periphery opposite the tool 3 by rigid framing tools 5.

The machining tool 3 and the mobile means for support 4 are connected to means for programmed numerical control 6 via conventional means 7 for multi-axial displacement of the tool 3 as well as conventional means 8 for displacing the support 4 opposite the panel 1.

The machining tool 3 is, for example, equipped with a toroidal cutter 9. The mobile support 4 preferably has the form of a spherical surface 10.

As will be described in greater detail with reference to FIG. 2, during the machining of, for example, a recess in the concave first surface 1a of the panel 1, the axis 11 of the cutter 9 and the axis 12 of the counterbalancing force F exerted by the sphere 10 of the means of support 4 on the surface 1b opposite the cutter 9 are coincident with the normal to the center of the area attacked by the cutter.

FIG. 1 does not show the means of displacement and application of the means for support 4 against the panel 1, nor the conventional means for displacing the cutter 9.

In the course of the machining operation, the sphere 10 is not only in constant contact with the surface 1b, but a slight pressure is constantly exerted during the machining of a recess 13 into the concave face 1a of the panel so as to guarantee the precision of the thickness e (FIG. 2).

In fact, during the machining of the aforesaid recess 13, the sphere 10 is initially brought into contact with the surface 1b of the panel 1, preferably with a sufficient force of application F to slightly elastically deform the panel 1 at the point of application P in the direction of the machining tool 3.

While the local thickness of the panel 1 is not known with precision, the distance D between the tool 3 and the means of support 4 is, on the other hand, accurately known and is independent of the position in space of the part of the panel 1 attacked by the cutter.

Since the distance d1 is by definition known and stored in the numerical control which controls the displacements of the tool 3 and the support 4, it is enough to control the axial displacement of the cutter 9 until the distance D minus the length of the cutter 9 in the example of FIG. 2 reaches the displayed value d1, corresponding to the thickness e. This process is implemented over the entire extent of the recess 13, with the tool 3 and the support 4 being synchronously displaced parallel to the panel, while the axes 11, 12 are not necessarily collinear.

It should be noted that the local reduction in the thickness of the panel during machining can take place via a displacement of the tool 3 relative to the support 4, which remains fixed, or inversely via a displacement of the support 4 in the direction of the tool 3, which is not displaced.

One can thus obtain precision of the bottom thickness (e) of ±0.1 mm on panels having a thickness of 1 to 12 mm and a size that can be very large, on the order of 6 m×3 m.

If, due to the precision of the production process of the rough panel, or a local variation in thickness, or both, the panel 1, at right angles to the recess 13, has a deviation in shape from its theoretical shape, it has no effect on the value of the thickness e obtained at the end of the machining process, since the machining process according to the invention is insensitive to these variations.

Chip removal at a high rate can also be performed by means of significant cuts without the risk of unrecoverable deformation of the panel 1 under the cutting force, since the panel is held on both sides, which improves the productivity considerably.

This method also allows for machining a concave surface 1a with toroidal cutters without having to make complex corrections of the trajectories or performing a "de-chucking" of the cutter, which substantially simplifies the programming of the numerical control of the tool 3.

FIG. 3 illustrates the well-known phenomenon called "over-cutting" during the machining of a concave first surface 1a using a toroidal cutter 9', with the attack of the material on the edge 14 of the cutter being more pronounced than at the center. To compensate for this, it is enough, as illustrated by FIG. 4, to press the supporting sphere 10 against the surface 1b of the panel 1 with a sufficient force to slightly locally deform the panel next to the cutter 9 during the entire machining operation. The momentary pressure created by the supporting sphere 10 causes a local increase, opposite the tool 9, in the radius of curvature of the first surface 1a only at 15, which increase can go as far as an inversion of the curvature as illustrated by FIG. 4, but this pressure does not produce an unrecoverable deformation in the affected area of the panel, which returns elastically to its initial shape.

FIG. 5 illustrates the machining of a panel 1' with a stiffener 16 having a part 16' which overhangs the area being machined. The process of this invention makes it possible effectively to incline the axis 11 of the cutter 9 with respect to the axis 12 through application of the force counterbalancing the machining pressure by means of the mobile support 4, with the intersection of two axes 11 and 12 preferably occurring at the point P where the counterbalancing force is applied.

Such an inclination of the axis 11 of the cutter with respect to the normal to the surface in the course of machining makes it possible to machine under the overhanging part 16'.

In general, the orientation or the inclination of the tool 3 with respect to the support 4 can generally be variable and continuous during machining, with this orientation being controlled by the numerical control 6.

FIG. 6 illustrates the production, in accordance with the invention's process, of a drilled hole in the panel 1 by means for a drill or a conventional cutter 9', the means of support 4' being configured for this purpose with a drilled hole 17 on the axis 12, and having a sufficient diameter to freely receive the drill or cutter 9' after traversing the panel.

It should be noted that this configuration of the mobile means for support 4' can be used to perform a trimming operation, in particular on the inside of the panel, for the later positioning of elements such as doors, hatches or windows, by providing a device for suctioning and disposing chips associated with the drilling operation 17.

Figure 7:
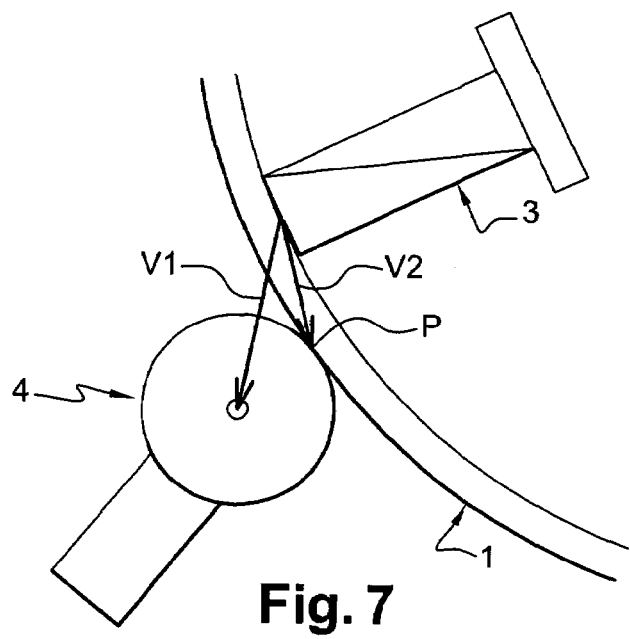
FIG. 7 illustrates a shifted positioning of the tool and the means of support.

Nevertheless, trimming will generally be performed by displacing the tool 3 with respect to a spherical support 4 as illustrated by FIG. 7, so that the tool can traverse the panel 1 without touching the support 4. In this kind of machining operation, the numerical control 6 of the machine continually determines the size and the orientation either of the vector $V_1$ connecting the center of the tool 3 to the center of the spherical support 4, or of the vector $V_2$ connecting the center of the tool to the point of contact P of the support 4, and it consequently controls the displacements and orientations of the tool and the support according to preprogrammed values.

It should be noted that this kind of machining can be used for machining operations other that trimming.

The size of the offset between the point P and the center of the tool 3 can reach a few tens of millimeters and depends on the stiffness of the panel 1, the force (F) of the support, and the cutting conditions.

The invention's process makes it possible to work on the entire surface of the panel 1, namely the area 18 that is delimited in FIG. 1, i.e. except for the peripheral areas for fastening (5) the panel.

During machining operations on the panel 1, the frame 5+panel 1 assembly can of course also be controlled by the numerical control 6 in synchronization with displacements of the tool 3 and the mobile support 4, depending on the kind of machining that is to be performed.

The method of the invention makes it possible to perform machining operations by either controlling the force exercised by the means of support 4 perpendicular to the point of contact or by controlling the position of the means for support, i.e. by controlling its position with respect to the theoretical profile of the panel defined by the latter as isostatically installed on the framing tool (5, 5').

The first mode of control is, preferably used in the vicinity of the edges of the panel where the local rigidity is higher, whereas position control is preferred in the central part of the panel. One can of course change from one mode of control to the other during the machining of the panel.

As mentioned above, the principle illustrated by FIG. 1 can be implemented according to various machine tool architectures.

Figure 8:
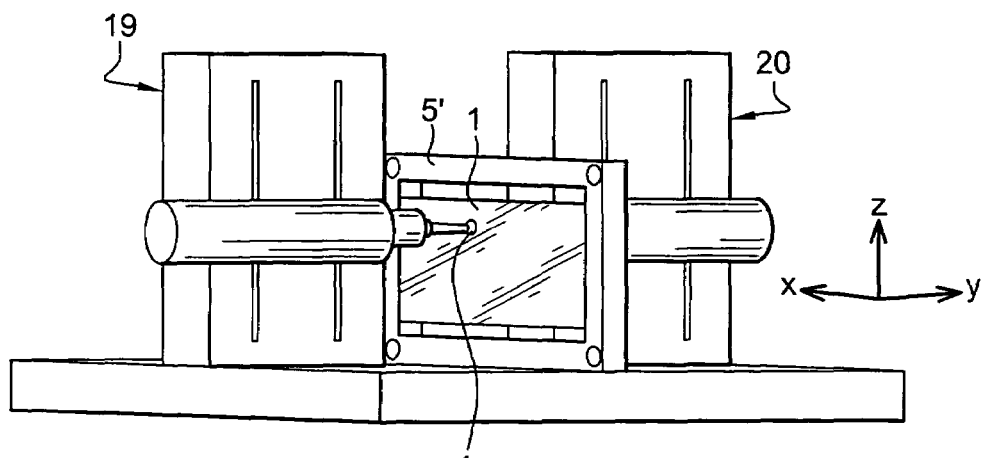
FIGS. 8 and 9 illustrate the implementation of the process with a machine tool architecture of the 2×5-axis type.
Figure 9:
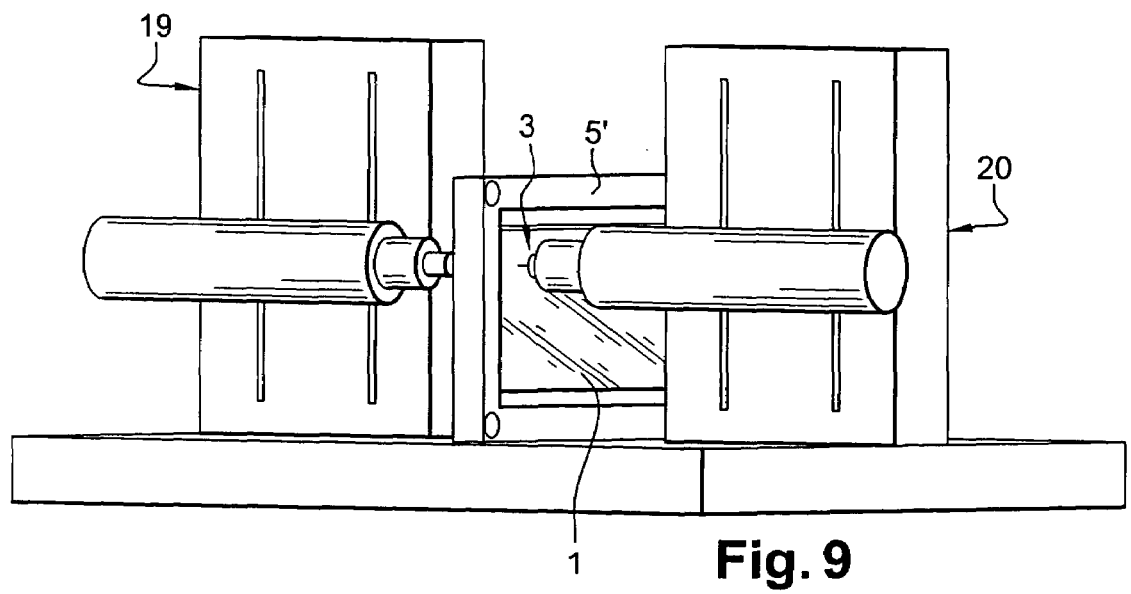

Thus, for example, it is possible to implement a 2×5-axis type architecture as illustrated in FIGS. 8 and 9. In this architecture, the panel 1 is placed vertically into a rigid framework 5' which holds the panel 1 on its periphery. The machine consists of two 5-axis structures 19, 20 respectively controlling the mobile support 4 (FIG. 8) and the machining head 3 (FIG. 9).

The structures 19 and 20 are installed so that they are mobile on both sides of the framework 5', which is fixed. The machining head 3 and the support 4 are mobile along the Cartesian axes X, Y, Z, as well as rotationally around the axes X and Z.

This architecture allows for the interchangeability of the elements 3 and 4 and thus for the machining of both surfaces of the panel 1, without unmounting the panel.

The machining head 3 can be controlled independent of the support 4, which makes it possible to control trajectories and complex tool orientations, for example with de-chucking, while preserving a constant distance between the end of the tool (the point generating the machined surface) and the end of the support 4 (point P).

Figure 10:
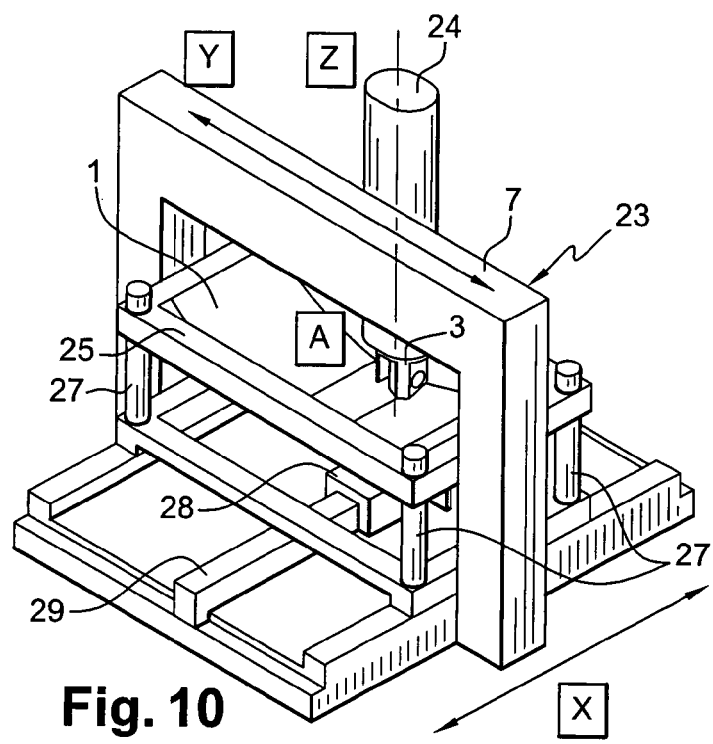
FIGS. 10 and 11 illustrate the implementation of the process with a machine tool architecture of the 2×4-axis type.
Figure 11:
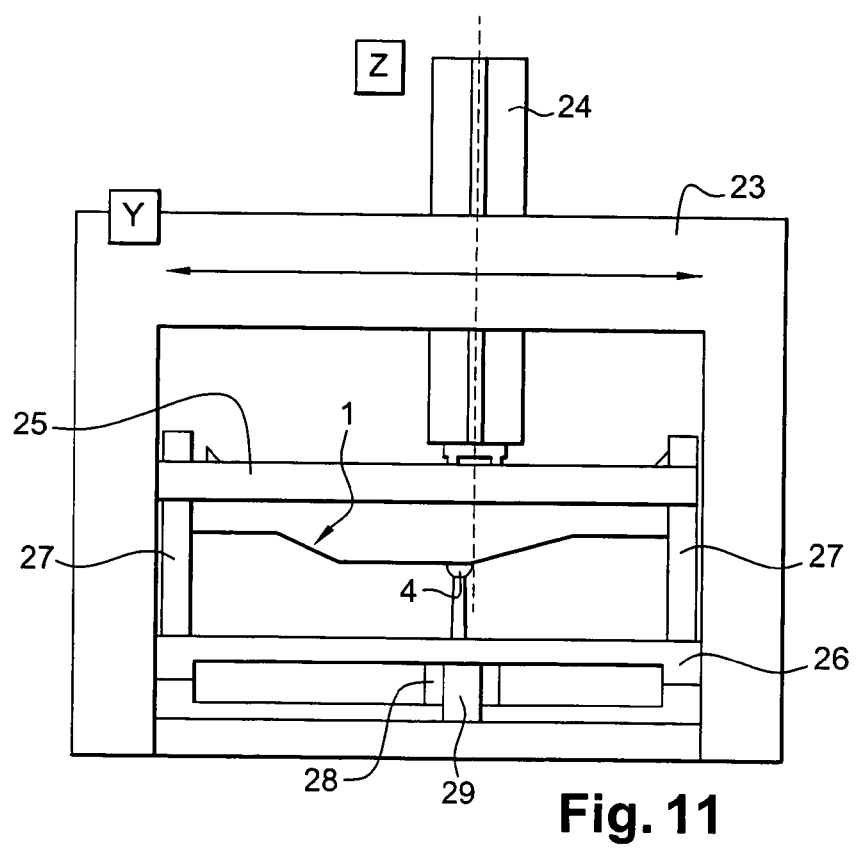

FIGS. 10 and 11 illustrate another architecture of the 2×4-axis type, wherein the (spherical) support in back is not oriented with respect to the local normal. In order to guarantee the machined thickness, the tool is oriented so that its axis points toward the center of the sphere of the support in back.

To this end, the machine is based on a "gantry" architecture, with the gantry 23 being in a fixed position and supporting a slider 24 which is displaced translationally along the Z and Y axes. The gantry 23 supports a machining head 3 (FIG. 10) of the "twist" type by rotating about the Z axis (rotational axis C) and the A axis (horizontal axis, perpendicular to Z).

Figure 12:
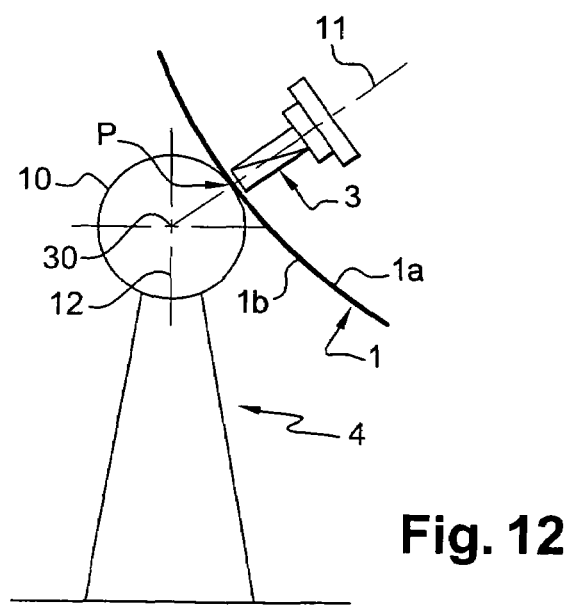
FIG. 12 is a detailed view of the device of FIG. 11.

The panel 1 is held in position peripherally by a horizontal framework 25 supported by a carriage 26 by means of four guide columns 27 so as to move along the Z axis. A slider 28 supporting the spherical support 4 (FIG. 11) is displaced along the X axis on a second carriage 29 which is movable along the Y axis. As shown more precisely by FIG. 12, on such a machine, the axis 12 of the mobile means for support 4 is, at the point of support P, not oriented perpendicular to the surface (1b) of the panel, with the axis 11 of the tool passing through the center 30 of the spherical part 10 of the support 4, which center 30 lies on the axis 12 of said support.

The method of the invention generally applies to machining operations such as trimming, drilling, and thickness machining of panels having a double curvature, which may or may not be developable, in a single operation without unmounting the panel.

It is also possible to perform the machining operations on the periphery of panels, except on the parts being held by the framing/holding tools.

The panels can be metallic and pre-shaped by any suitable methods. The panels can also consist of composite materials and be shaped by any suitable methods, or of laminates.

The invention claimed is:

1. A method for mechanical machining of a flexible panel having a complex shape, the method comprising:
   holding the panel to be machined fixed on a periphery on a rigid support;
   applying a machining tool against a first surface of the panel and controlling the tool to perform a machining operation;
   during the machining operation, counterbalancing a machining force exerted by the tool on the panel by applying a force approximately opposing the tool through the application of a multi-axial mobile support means to a second surface of the panel opposite the first surface to which the tool is applied;
   exerting the force of the multi-axial mobile support means on a convex portion of the second surface of the panel to create a deformation of the panel by creating a local increase in a radius of curvature on the first surface, wherein the local increase in the radius of curvature may go as far as an inversion of the curvature opposite the tool, and wherein the deformation of the panel is elastic and reversible; and
   measuring the localized thickness of the panel by a knowable distance between the machining tool and the support means for controlling the machining operation.

2. The method of claim 1, wherein the tool and the multi-axial mobile support means are moved synchronously, and wherein respective axes of the tool and the multi-axial mobile support means are coincident.

3. The method of claim 2, wherein the respective axes of the tool and the multi-axial mobile support means are coincident with the normal to a center of an area being machined.

4. The method of claim 2, wherein the force exerted by the multi-axial mobile support means is at least equal to the machining force exerted by the tool.

5. The method of claim 4, wherein, for machining a recess, the method further comprises:
   continuously measuring a distance between the tool and the multi-axial mobile support means during the machining process; and
   stopping advance of the tool when the distance reaches a predetermined value.

6. The method of claim 1, further comprising:
   continuously measuring a magnitude and an orientation of one of either a vector connecting a center of the tool to a center of the multi-axial mobile support means, or a vector connecting the center of the tool to a point of contact with the panel of the multi-axial mobile support means; and
   controlling a displacement and an orientation of the tool and the multi-axial mobile support means, respectively, based on the measurement of the magnitude and the orientation and according to preprogrammed values.

7. The method of claim 6, wherein the tool and the multi-axial mobile support means are offset.

8. The method of claim 1, wherein the force of the multi-axial mobile support means is controlled.

9. The method of claim 1, wherein a position of the multi-axial mobile support means is controlled.

10. The method of claim 1, wherein the tool and the multi-axial mobile support means are moved synchronously, and wherein respective axes of the tool and the multi-axial mobile support means do not align and intersect each other.

11. The method of claim 10, wherein an inclination of the tool is variable.

12. The method of claim 1, wherein the tool and the multi-axial mobile support means are controlled independently.

13. The method of claim 10, wherein the axis of the tool is perpendicular to the first surface of the panel.

14. The method of claim 10, wherein the axis of the multi-axial mobile support means is perpendicular to the second surface of the panel, and wherein the axis of the tool intersects the axis of the multi-axial mobile support means at a point of application of the multi-axial mobile support means against the second surface of the panel.

15. A device for mechanical machining of flexible panels having complex shapes, the device comprising:
   a rigid tool adapted to frame a panel to be machined and to hold the panel on at least part of a periphery of the panel;
   a machining head adapted for multi-axial mobility and numerical control;
   a multi-axial mobile support means adapted to be positioned on a first surface of the panel opposite a second surface facing the machining head, wherein the multi-axial mobile support means comprises a spherical surface having a center on an axis of the multi-axial mobile support means;
   means for controlling displacement of the multi-axial mobile support means such that the multi-axial mobile support means is in permanent contact with the panel during displacement along the first surface of the panel during a machining operation;

command and control means for synchronous displacement of the machining head and the multi-axial mobile support means with respect to the panel during the machining operation; and command and control means for mutual separation between the machining head and the multi-axial mobile support means such that the multi-axial mobile support means is independent of the machining head.

16. The device of claim 15, further comprising:

a 2×5-axis architecture including a rigid framework adapted to hold the panel vertically and mobile in a first horizontal direction along a gantry;

two 5-axis structures adapted to respectively control the multi-axial mobile support means and the machining head, wherein the structure adapted to control the machining head is mobile in a second and third direction orthogonal to the first horizontal direction.

17. The device of claim 15, further comprising:

a 2×4-axis architecture including a rigid framework adapted to maintain the panel horizontally and mobile in a first vertical direction;

a structure adapted to carry the multi-axial mobile support means and move the multi-axial mobile support means in a second and a third direction orthogonal to the first direction; and a structure adapted to carry the machining head mounted on a gantry to move in the second and third directions, wherein the structure adapted to carry the machining head is adapted to rotate about an axis of the first direction and about a horizontal axis perpendicular to the axis of the first direction.

18. The device of claim 15, wherein the machining head and the multi-axial mobile support means are interchangeable.

19. The device of claim 15, wherein the spherical surface is pierced with a bored hole on the axis of the multi-axial mobile support means, wherein the bored hole has a diameter sized to receive a cutter or a tool for drilling or trimming the panel.

20. A device for mechanical machining of flexible panels having complex shapes, the device comprising:

a rigid tool adapted to frame a panel to be machined and to hold the panel on at least part of a periphery of the panel;

a machining head adapted for multi-axial mobility and numerical control;

a multi-axial mobile support assembly adapted to be positioned on a first surface of the panel opposite a second surface facing the machining head, the multi-axial mobile support assembly adapted to exert a force on the first surface of the panel to counterbalance a force exerted by the machining head on the second surface of the panel during a machining operation;

wherein the multi-axial mobile support assembly is independent of the machining head and is in permanent contact with the panel during displacement of the multi-axial mobile support assembly along the first surface of the panel and the machining head along the second surface of the panel, and wherein the multi-axial mobile support assembly comprises a spherical surface having a center on an axis of the multi-axial mobile support assembly.

* * * * *